United States Patent
Tan et al.

(10) Patent No.: US 10,491,664 B2
(45) Date of Patent: Nov. 26, 2019

(54) ASYNCHRONOUS WEB SERVICE CALLOUTS AND SERVLET HANDLING

(71) Applicant: salesforce.com, inc., San Francisco, CA (US)

(72) Inventors: Yan Tan, Redmond, WA (US); Gregory D. Fee, Seattle, WA (US); Sreeram Duvur, Fremont, CA (US); Christopher Wall, Austin, TX (US)

(73) Assignee: salesforce.com, inc., San Francisco, CA (US)

( * ) Notice: Subject to any disclaimer, the term of this patent is extended or adjusted under 35 U.S.C. 154(b) by 122 days.

(21) Appl. No.: 14/512,827

(22) Filed: Oct. 13, 2014

(65) Prior Publication Data
US 2016/0105532 A1    Apr. 14, 2016

(51) Int. Cl.
*H04L 29/08* (2006.01)

(52) U.S. Cl.
CPC ................... *H04L 67/10* (2013.01)

(58) Field of Classification Search
USPC ......................................................... 709/203
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |

(Continued)

OTHER PUBLICATIONS

Khalid Elgazzar, Patrick Martin, and Hossam Hassanein, "A Framework for Efficient Web Services Provisioning in Mobile Environments", MobiCASE 2011, LNICST 95, pp. 246-262, 2012.*

*Primary Examiner* — Brian Whipple
*Assistant Examiner* — John Fan
(74) *Attorney, Agent, or Firm* — Jaffery, Watson, Mendonsa & Hamilton, LLP

(57) ABSTRACT

Techniques and mechanisms for providing asynchronous web service calls in an on-demand services environment. In response to request from a remote client, a page is provided. The page has content including logic to retrieve information from a remote resource external to an on-demand services environment via at least one asynchronous web service call. A controller component of the page is loaded before rendering a response to the remote computing device. At least one web service call is sent to the remote resource with the controller component. A continuation object is returned with the controller component to release the first thread from waiting for a response to the web service call. The continuation object provides a label to be used when handling the response. The response to the web service call is received from the remote resource and processing is resumed with the continuation object.

15 Claims, 5 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,745,203 B1 * | 6/2004 | Garg ............... G06F 17/30607 |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,206,807 B2 * | 4/2007 | Cheenath ............... H04L 29/06 |
| | | 709/203 |
| 7,340,411 B2 | 3/2008 | Cook |
| 7,620,655 B2 | 11/2009 | Larsson et al. |
| 8,868,757 B1 * | 10/2014 | Liu ..................... H04L 63/0281 |
| | | 709/220 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2010/0199036 A1 * | 8/2010 | Siewert ................. G06F 3/0613 |
| | | 711/112 |
| 2010/0235542 A1 * | 9/2010 | Visharam ............... G06F 15/16 |
| | | 709/246 |
| 2011/0264861 A1 * | 10/2011 | Fee ....................... G06F 9/5027 |
| | | 711/122 |
| 2012/0151062 A1 * | 6/2012 | Gusev ................... G06F 9/5011 |
| | | 709/226 |
| 2014/0081950 A1 | 3/2014 | Rajan et al. |

* cited by examiner

US 10,491,664 B2

ASYNCHRONOUS WEB SERVICE CALLOUTS AND SERVLET HANDLING

TECHNICAL FIELD

Embodiments relate to thread management for web service calls. More particularly, embodiments relate to techniques for efficiently managing threads to avoid thread starvation in a system making web services calls.

BACKGROUND

When individuals/organizations/multitenant clients have large amounts of data, it is common for the data to be stored on devices that belong to different environments. For example, an organization may have a large amount of data stored in a multitenant database environment and other data (e.g., legacy data) stored in a database that is not part of the multitenant database environment. When a user is working within the multitenant database environment, the user may require access some of the data stored in the other environment. This data may be acquired via a web services call from the multitenant database environment to the other environment.

As another example, a user in a database environment may need dynamic data from a vendor or other source. The user's database environment can acquire the dynamic data via a web services call. Typically, when a web services call is made, the requesting device/server/environment stalls the requesting thread until a response is received. This can lead to inefficient use of resources.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

When providing an on-demand services environment, the service provider has no way of knowing the latency associated with a call to a remote device outside of the on-demand services environment (e.g., a web services call). One approach is for the requesting thread to be blocked while waiting for the response. However, if too many threads are blocked, the pool of available threads may be exhausted, which can result in thread starvation. This can also be a potential denial of service (DOS) attack vulnerability.

One solution to this problem is to limit the number of outbound calls that can be pending at any time. However, for some customers/tenants, this can be problematic. Described below is a technique for providing asynchronous, non-blocking calls that does not lock any thread pool resources. In one embodiment, this technique utilizes an asynchronous client (e.g., HTTP client) for the call (e.g., web services call) and a servlet container that supports asynchronous servlet request handling. Ideally, no thread is blocked waiting for a response to a call.

Figure 1:
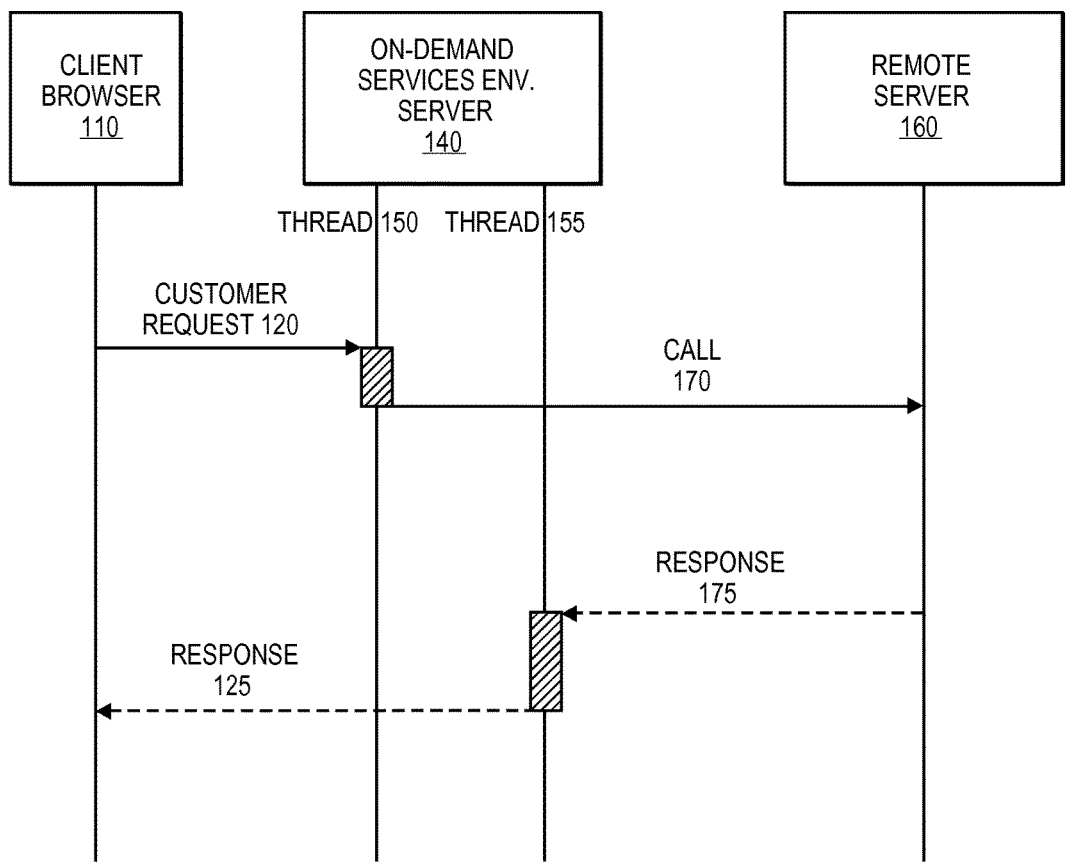
FIG. 1 is a conceptual diagram of a technique for supporting asynchronous web services calls through an on-demand services environment.

FIG. 1 is a conceptual diagram of a technique for supporting asynchronous web services calls through an on-demand services environment. The example of FIG. 1 is directed to a user accessing the on-demand services environment via a browser application on a computing platform (e.g., desktop computer, laptop computer, tablet, smartphone, wearable device) and accessing, for example a multitenant database system. Other environments and systems can also utilize the techniques described herein.

Client browser 110 is any type of browser device that allows a computing platform to access remote resources, for example, a well-known web browser (e.g., Safari, Internet Explorer, Chrome, Firefox, Opera). Other types of browsing applications can also be utilized. In an alternate embodiment, a dedicated app may be used.

At some point of operation, client browser 110 generates customer request 120, which is a request for information not stored in the on-demand services environment. Customer request 120 can be the result of a specific action or request by the user or can be the result of refresh or data population activities.

In one embodiment, customer request 120 is provided to on-demand services environment server 140 via an application programming interface (API); however, other techniques can also be utilized. In one embodiment, on-demand service environment server 140 maintains a pool of threads that can be used to service requests to and from client devices (e.g., those running browsers) as well as to and from remote devices (e.g., servers).

In one embodiment, on-demand services environment server 140 allocates thread 150 to receive customer request 120 from client browser 110. In one embodiment, an intermediary agent evaluates customer request 120 and invokes the method to generate call 170 to remote server 160 to acquire the information requested in customer request 120. In one embodiment, parallel to the callout, thread 150 serializes the state of customer request 120. The intermediary agent can also release resources. In one embodiment, the memory objects used for serializing the state of customer request 120 are stored in memory outside of the virtual machine handling customer request 120. Call 170 can be, for example, a HTTP call or other operation to request/acquire the data from remote server 160. After call 170 is sent, thread 150 returns to the thread pool rather than waiting for the response. Thus, thread 150 is not blocked waiting for the response.

Remote server 160 provides the requested data via response 175 that is sent from remote server 160 to on-demand services environment server 140. Response 175 is handled by thread 155 to generate response 125. In one embodiment, on-demand service environment server 140 allocates thread 155 in response to receiving response 175 so that blocking of a thread is not required to wait for response 175. Thread 155 then generates response 125 to provide the requested data to client browser 110. In one embodiment, thread 155 can operate to formulate resource and reconstitute the state of customer request 120 and invoke the callback.

In one embodiment, response 175 is formulated in the web, or application, tier. Thus, the logic and web tiers can enable a customer to apply business rules or other logic to shape the result for end-user consumption.

The example of FIG. 1 illustrates two threads for reasons of simplicity of description only. Any number of threads can be provided in the thread pool. Also, any number of client browsers, on-demand services environment servers and/or remote servers can be supported.

Figure 2:
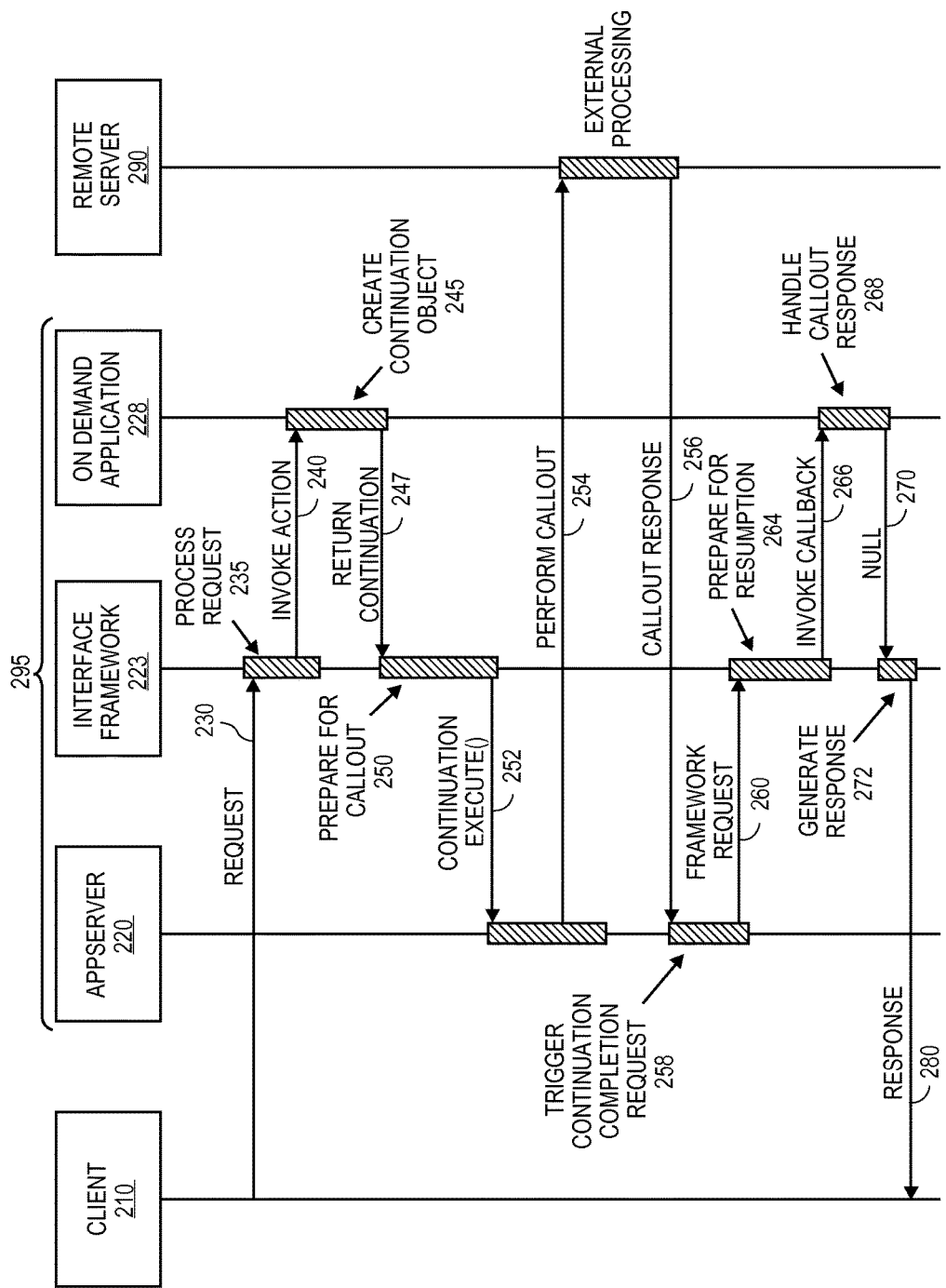
FIG. 2 is a more detailed conceptual diagram of one embodiment of a technique for supporting asynchronous web services calls through an on-demand services environment.

FIG. 2 is a more detailed conceptual diagram of one embodiment of a technique for supporting asynchronous web services calls through an on-demand services environment. The example of FIG. 2 is directed to a user accessing the on-demand services environment via a browser application on a computing platform (e.g., desktop computer, laptop computer, tablet, smartphone, wearable device) and accessing, for example a multitenant database system. Other environments and systems can also utilize the techniques described herein.

Client device 210 is any type of computing device capable of running a browser application that allows the computing device to access remote resources. In an alternate embodiment, a dedicated app may be used. At some point of operation, client device 210 generates request 230, which is a request for information not stored in the on-demand services environment. Request 230 can be the result of a specific action or request by the user or can be the result of refresh or data population activities.

In one embodiment, client device 210 sends request 230 to on-demand services environment server(s) 295 that can include application server 220, user interface framework 223 and on-demand application platform 228. On-demand services environment server(s) 295 can be a collection of one or more servers that provide, for example, a multitenant database environment. More detailed examples of multitenant environments are provided below.

Application server (or appserver) 220 is a server platform that handles application operations between client device 210 and the on-demand services environment. In one embodiment, interface framework 223 is a component-based user interface framework, for example, Visualforce available from salesforce.com of San Francisco, Calif. In one embodiment, interface framework 223 provides controllers for various objects (e.g., database objects) within the on-demand services environment. In one embodiment, on-demand application platform 228 provides a set of features for building applications including data models and objects to manage data, a workflow engine for managing collaboration of that data between users, a user interface model to handle forms and other interactions, and an interface for programmatic access and integration.

In one embodiment, request 230 is received by interface framework 223 to process the request, 235. In one embodiment, interface framework 223 invokes action 240 in response to receiving request 230, In one embodiment, in response to action 240 from interface framework 223, on-demand application platform 228 returns a continuation object 247 to interface framework 223. Continuation objects are described in greater detail below. In response to continuation object 247, interface framework 223 can prepare for the web services call by saving any relevant state information, 250.

In one embodiment, the continuation object is returned to application server 220 for execution, 252, Application server 220 then performs the web services callout, 254. The web services callout goes to remote server 290 that processes (external processing) the callout and provides the requested information as a response, Remote server 290 provides callout response 256 to application server 220. In one embodiment, application server 220 triggers continuation completion 258 in response to callout response 256, in one embodiment, the previously stored state information is retrieved and restored at this point.

In one embodiment, application server 220 then sends framework request 260 to interface framework 223, which can then prepare for resumption 264. In one embodiment, part of preparation for resumption is restoration of the state information stored previously by interface framework 223 (in preparation for the callout 250). Interface framework 223 then invokes a callback 266 to on demand application platform 228, which can then handle the callout response 268. In one embodiment, on demand application platform 228 returns a null 270 to interface framework 223, which then generates a response 272. Response 280 is then sent to client device 210.

Figure 3:
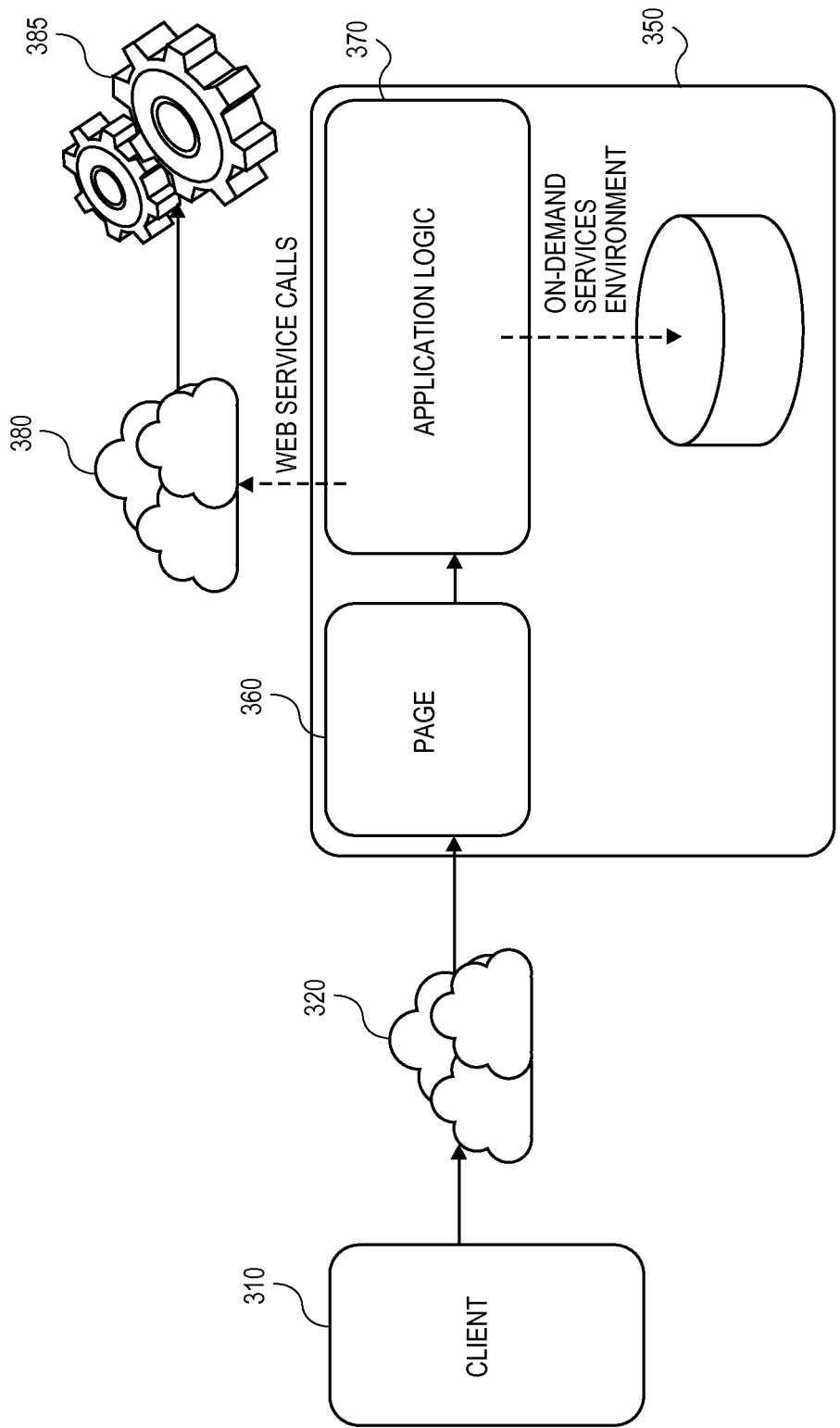
FIG. 3 is a conceptual diagram of an on-demand services environment that can make web services calls for client devices.

FIG. 3 is a conceptual diagram of an on-demand services environment that can make web services calls for client devices. In the example of FIG. 3, a user utilizes client 310 to access on-demand services environment 350. Client 310 can be, for example, a computing platform (e.g., smartphone, tablet, laptop, desktop, kiosk, wearable device) running a browser application, or client 310 can be a computing platform running an application designed for the purpose of providing access to on-demand services environment 350.

Client 310 accesses page 360 within on-demand services environment 350 via network 320. Network 320 can be any combination of wired and/or wireless networks that connect client 310 to on-demand services environment 350. Communication over network 320 can be accomplished using various protocols known in the art. In one embodiment, application logic 370 can interact with on-demand services environment 350, invoke external web service calls, or both, before returning the view to client 310.

Page 360 provides a portal to on-demand services environment 350 for client 310. In one embodiment, page 360 can react differently to different client browsers such as those on a mobile or touch screen device. In one embodiment, all application logic runs on the server, so no additional client-side callbacks are needed to render a complete view. In one embodiment, application logic 370 can make server-side call outs to any remote service, Various techniques for these call outs are described herein.

In one embodiment, web service calls are made by application logic 370 and transmitted over network 380 (which may be the same or different than network 320) to remote resource 385, The web services calls can be handled as described herein, for example, according to the flow of FIG. 1.

The following are a few example use cases where asynchronous web services calls can be utilized. In the first example, customer desires to build a page containing an order status, where the order status value is to be obtained from a web services callout, as it is not stored in a local database (e.g., a database within a multitenant environment). In this example, the customer defines: 1) a page (e.g., page 360) that displays the order information including order status (OrderDetail); and 2) a controller (MyController) of the page that has logic to retrieve the order status by using a web services call.

The following code is an example that can be used to provide OrderDetail:

```
<page id="thePage" controller="MyController" setup="true"
showHeader="false" action="{!prepare}">
...
<outputText style="font-weight:bold" value="{!orderStatus}" />
...

```

The following code is an example that can be used to provide the controller:

```
public class with sharing MyController {
    String orderStatus {get;}
    String orderStatusLabel;
    public Object prepare( ) {
        // set the continuation call out
        String orderId = ApexPages.currentPage( ).getParameters( ).get('orderid');
        HttpRequest req = new HttpRequest( );
        req.setMethod("get");
        req.setUrl("customer.company.com/special/WS/getOrderStatus?orderId="+orderId);
        Continuation c = new Continuation(120);   // max 120 seconds for the wait time of WS response.
        orderStatusLabel = c.addHttpRequest('orderStatusLabel', req);
// remember the label to obtain the result later;
        c.setContinuationMethod('handleResult'); // make the handleResult( ) to handle the callout result.
        return c; // returning a valid Continuation object indicates this page
processing must be suspended after calling c.execute( ) by the engine.
    }
    public Object handleResult ( ) {
        HttpResponse orderStatusResponse = Continuation.getResponse(orderStatusLabel);
        if (orderStatusResponse == null) {
                        //report error.
        }
        if (orderStatusResponse.getStatusCode( ) == WSResponse.TIMEOUT)
orderStatus = 'Unable to obtain the status due to timeout.';
        else if (orderStatusResponse.getStatusCode( ) == WSResponse.ConnectionFailure)
orderStatus = 'Unable to Obtain the status due to ' + WSResponse.getErrorMessage( );
        else if (orderStatusResponse.getStatusCode( ) == WSresponse.OK){
orderStatus = orderStatusResponse.getResponseBody( ); // extract the Order status from response body
        }
        return null; // returning null will indicates there is no need to suspend the processing any more.
    }
    public String getOrderStatus( ) {
    return orderStatus;
    }
}
```

In the example above, when a client browser accesses the Order Detail page the controller is loaded. Because the Order Detail page specifies the "action" attribute to be "{!prepare}", the Prepare method of the controller is invoked before the response is rendered.

The prepare method manages the web services to retrieve the order status. Traditionally a http.send( ) or comparable operation would be used to send the web services call, which will tie up the servlet handling thread during the waiting time. Using the technique described herein, the asynchronous web services call is utilized. In one embodiment, the "Continuation" object is created and added to the HTTP request in Continuation with a label of "orderStatusLabel." This label can be used when retrieving the web services response when it arrives. In one embodiment, the ContinuationMethod can be set to be "handleResponse" on the continuation object. This indicates when the response has arrived and the servlet handling has resumed.

In one embodiment, the controller performs the following three tasks: 1) The controller starts an asynchronous context method so that the container can determine that the request handling has not completed, but is to be suspended; 2) The controller asynchronously sends out the web services call; and 3) The controller sets up a listener method for the web service call so that when the response arrives servlet handling can be resumed using the asynchronous context (from 1) above).

In one embodiment, once the web service response arrives, servlet handling can be resumed as discussed above. The application logic can continue to process browser requests in a second round of servlet handling. In one embodiment, for the response, the handleResult( ) method is invoked first and can return a "null" to indicate there is no longer a need to suspend the engine to wait for web service results or can indicate another valid Continuation object to handle another web service call. Thus, multiple calls can be handled sequentially and/or in parallel.

One aspect of the Continuation object functionality is resource management where resources are "put to rest" while waiting for a callout to complete. Prior to the call out and resource releasing, the continuation objects can record the state of the transaction (e.g., request parameters, variables). This information can be available upon callout completion. This enables the initial request to be cohesive and require no additional functionality to be provided by the developer.

The following code provides an example of multiple web service calls in parallel. This second example is similar to the first example except that two web calls are utilized, one for order status and one for the sales agent of the order. The techniques of this second example can be extended to any number of parallel web service calls.

In this second example, the Order Detail page displays order information including order status. Further, the controller has logic to retrieve the order status with a first web service call and logic to retrieve the sales agent information with a second web service call. The first web service call and the second web service call are to different resources, for example, by utilizing different Uniform Resource Locators (URLs).

The following code is an example that can be used to provide OrderDetail:

```
<page id="thePage" controller="MyController" setup="true"
showHeader="false">
...
<outputText style="font-weight:bold" value="{!orderStatus}" />
<outputText style="font-weight:bold" value="{!orderAgentName}" />
...

```

The following code is an example that can be used to provide the controller:

```
public class with sharing MyController {
    String orderStatus {get;}
    String orderStatusLabel;
```

-continued

```
    String orderAgentName;
    String orderAgentLabel;
    public Object prepare( ) {
// The WS call out to get the OrderStatus is set it up here.
        String orderId = ApexPages.currentPage( ).getParameters( ).
        get('orderid');
        HttpRequest req = new HttpRequest( );
        req.setMethod("get");
        req.setUrl("https://customer.company.com/special
/WS/getOrderStatus?orderId="+orderId);
        HttpRequest req2 = new HttpRequest( );
        req2.setMethod("get");
        req2.setUrl("https://customer.company.com/special
/WS/getOrderAgent?orderId="+orderId);
        Continuation c = new Continuation(120); // max 120 seconds for
the wait time of WS response.
        orderStatusLabel = c.addHttpRequest('orderStatusLabel', req);
        orderAgentLabel = c.addHttpRequest('orderAgentLabel', req2);
        c.setContinuationMethod('handleResult');
        return c; // returning a valid Continuation object indicates this
VF page processing must be suspended // after calling c.execute( ) by
the
VF engine.
    }
  public Object handleResults( ) {
      WSResponse orderStatusResponse =
Continuation.getResponse('orderStatusLabel');
      WSResponse userAgentResponse =
Continuation.getResponse('userAgentLabel');
      if (orderStatusResponse.getStatusCode( ) == WSResponse.
      TIMEOUT)
orderStatus = 'Unable to obtain the status due to timeout.';
      else if (orderStatusResponse.getStatusCode( ) ==
WSResponse.ConnectionFailure)
         orderStatus = 'Unable to Obtain the status due to ' +
WSResponse.getErrorMessage( );
      else if (orderStatusResponse.getStatusCode( ) == WSresponse.OK){
         orderStatus = orderStatusResponse.getResponseBody( );
// extracting the order status from response body
      }
      orderAgentName = userAgentResponse.getResponseBody( );
// abbreviated error handling similar to order status.
      return null; // returning null will indicates there is no need to sus-
pend
the VF processing any more.
      }
    }
    public String getOrderStatus( ) {
    return orderStatus
    }
    public String getOrderAgentName( ) {
    return OrderAgentName;
    }
}
```

The second example is similar to the first example except that the second example provides two web service calls into the continuation object before returning the continuation object. The engine can then suspend processing until both web service responses have arrived.

The third example provides chained web services calls. In this example, a customer wishes to make two web service calls, but not in parallel because the second call depends on the result of the first call. The third example provides two web service calls, but any number of chained web service calls can be supported. Further, combination of parallel and chained web service calls can also be supported using the techniques described herein.

In the third example, the order detail page provides order information including the order status. In this example, the controller includes logic to retrieve the order status using a web service call. If, and only if, the order status is "Agent Reviewing" will the controller also make the second call to retrieve the sales agent name via a second web service call.

The first web service call and the second web service call are to different resources, for example, by utilizing different URLs.

The following code is an example that can be used to provide OrderDetail:

```
<page id="thePage" controller="MyController" setup="true"
showHeader="false">
...
<outputText style="font-weight:bold" value="{!orderStatus}" />
<outputText style="font-weight:bold" value="{!orderAgentName}" />
...

```

The following code is an example that can be used to provide the controller:

```
public class with sharing MyController {
    String orderStatus {get;}
    String orderStatusLabel
    String orderAgentName;
    String userAgentLabel;
    public Object prepare( ) {
       // The WS call out to get the OrderStatus is set it up here.
       String orderId = ApexPages.currentPage( ).getParameters( ).
       get('orderid');
       HttpRequest req = new HttpRequest( );
       req.setMethod("get");
       req.setUrl("https://customer.company.com/special
/WS/getOrderStatus?orderId="+orderId);
       Continuation c = new Continuation(120); // max 120 seconds for
the wait time of WS response.
       orderStatusLabel = c.addHttpRequest('orderStatusLabel', req);
       return c; // returning a valid Continuation object indicates this page
processing must be suspended
       // after calling c.execute( ) by the VF engine.
    }
    public Object handleOrderStatus( ) {
       WSResponse orderStatusResponse =
Continuation.getResponse(orderStatusLabel);
       if (orderStatusResponse == null) reportError( );
       // After we have the order status, see if we need to make the sec-
ond
       WS call.
       orderStatus = orderStatusResponse.getResponseBody( ); //
extracting the Order status. Error Handling omitted
       if (!StringUtils.equals(orderStatus, 'Agent Reviewing') {
          orderAgentName = '';
          return null; // returning null will indicates there is no need to
suspend the VF processing any more. }
          // otherwise, retrieve the agent name by returning a new
continuation object.
       Continuation c = new Continuation(120); // max 120 seconds for
the wait time of WS response.
       HttpRequest req2 = new HttpRequest( );
       req2.setMethod("get");
       req2.setUrl("https://customer.company.com/special
/WS/getOrderAgent?orderId="+orderId);
       userAgentLabel = c.addHttpRequest(, req2);
       c.
       return c; // returning another continuation object to indicate to
suspend again to wait for another
    }
    public Object handleAgentName( ) {
       WSResponse userAgentResponse = Continuation.getResponse
       (userAgentLabel);
       // after the response of the second WS calls (the second callout)
arrives.
       orderAgentName = userAgentResponse.getResponseBody( );
    // abbreviated error handling.
       return null; // returning null will indicates there is no need to
suspend the VF processing any more.
    }
    public String getOrderStatus( ) {
    return orderStatus
    }
```

```
public String getOrderAgentName( ) {
  return OrderAgentName;
  }
}
```

In third example, the first clause is to be executed during the initial round of handling. When there is no response from the first web service call, the controller sets up the continuation object to make the web service call to get the order status and request suspension of processing after sending the web service call by returning the continuation object. The second round of servlet handling starts with method invocation of handleOrderStatus( ), which is to be executed when the processing engine resumes after the order status web service call responds and extracts the order status information.

If the result is not "Agent Reviewing" the agent name is assigned empty/null, which causes the processing engine to process normally without suspension. If the order status is "Agent Reviewing" the second web service call is set up to get the agent name and to request suspension of the processing engine again. The is done by returning yet another continuation object containing the second web service call and setting up a third round of handling.

In the fourth example, after the order detail is displayed a customer can modify the order status and save the updated status. In one embodiment, when this happens, a postback action can be used to make a web service call to update the order status in the remote storage.

The following code is an example that can be used to provide OrderDetail in which a user can change the order status information:

```
<page id="thePage" controller="MyController" setup="true"
showHeader="false">
...
<outputText style="font-weight:bold" value="{!orderStatus}" />
<outputText style="font-weight:bold" value="{!agentName}" />
...
<commandButton value='save order' action='{!saveOrder}'
rerender="theForm" />

```

The following code is an example that can be used to provide the controller:

```
public class with sharing MyController {
  String orderStatus {get;}
  String saveOrderLabel;
  public Object saveOrder( ) {
    if (saveOrderResponse != null) {
      // we have not made the WS call out to save the Order in
customer's storage. So set it up here.
      String orderId = ApexPages.currentPage( ).getParameters( ).
get('orderid');
      HttpRequest req = new HttpRequest( );
      req.setMethod("POST");
      req.setUrl("https://customer.company.com/special/WS/
updateOrderStatus);
      req.setHeader('Content-Type', 'application/x-www-form-
urlencoded');
      req.setBody('orderId='+getOrderId( ) +'&orderStatus=
'+getOrderStatus( ));
      Continuation c = new Continuation(120); // max 120 seconds
for the wait time of WS response.
      saveOrderLabel = c.addHttpRequest('saveOrderLabel', req);
      c.setContinuationMethod('handleResult');
      return c; // returning a valid Continuation object indicates this
page processing must be suspended
      // after calling c.execute( ) by the VF engine.
    }
    public Object handleResult( ) {
      WSResponse saveOrderResponse =
ContinuationsUtil.getResponse(saveOrderLabel);
      if (saveOrderResponse.getStatusCode( ) != 200) {
        handleAndReportErrors( );
        return null;
      } else {
        // continue local processing of saving the Order details.
      }
    }
    public String orderStatus {
      get { return orderStatus; }
      set { orderStatus = value; }
    }
  }
}
```

Figure 4:
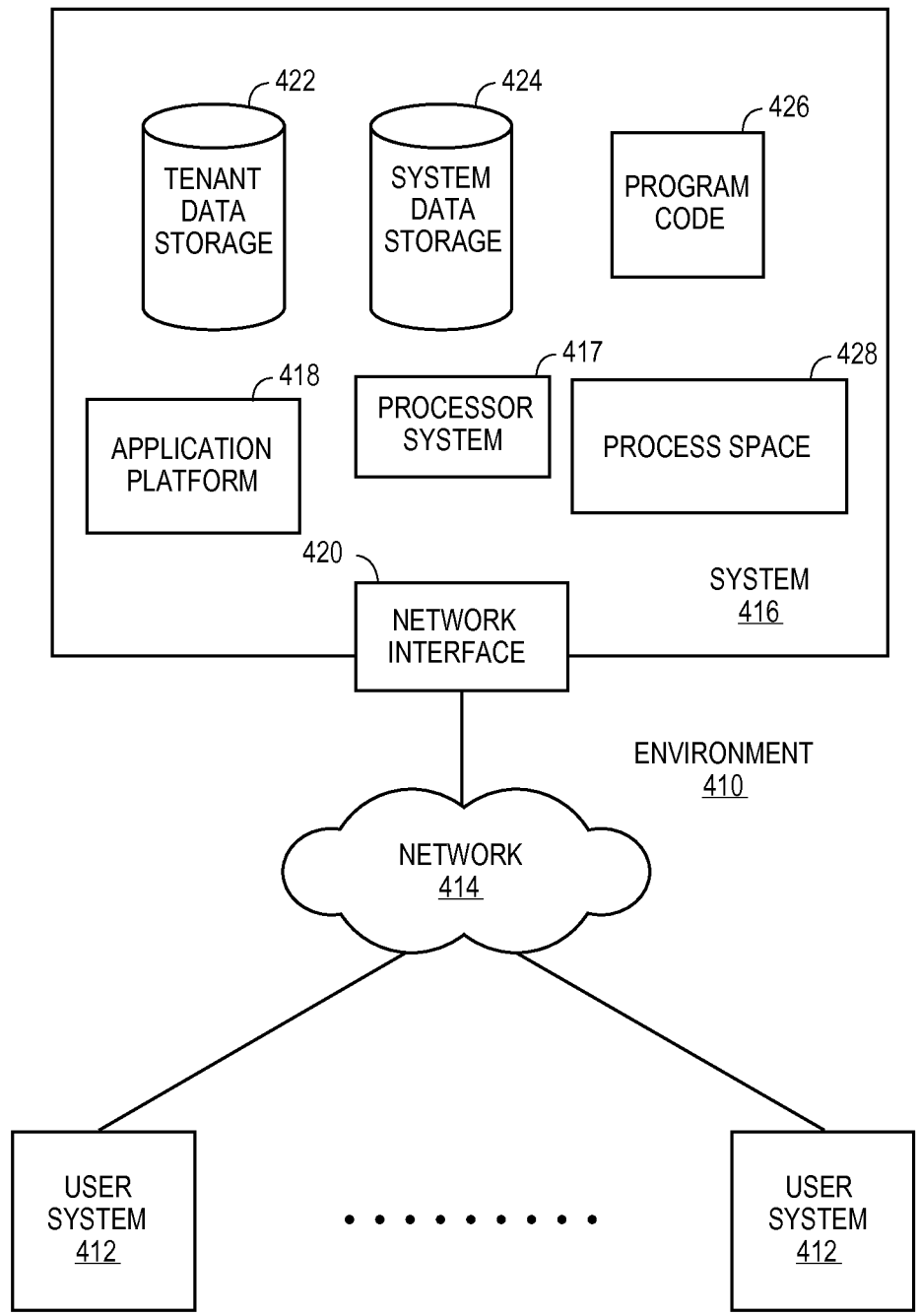
FIG. 4 is a block diagram of one environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 5:
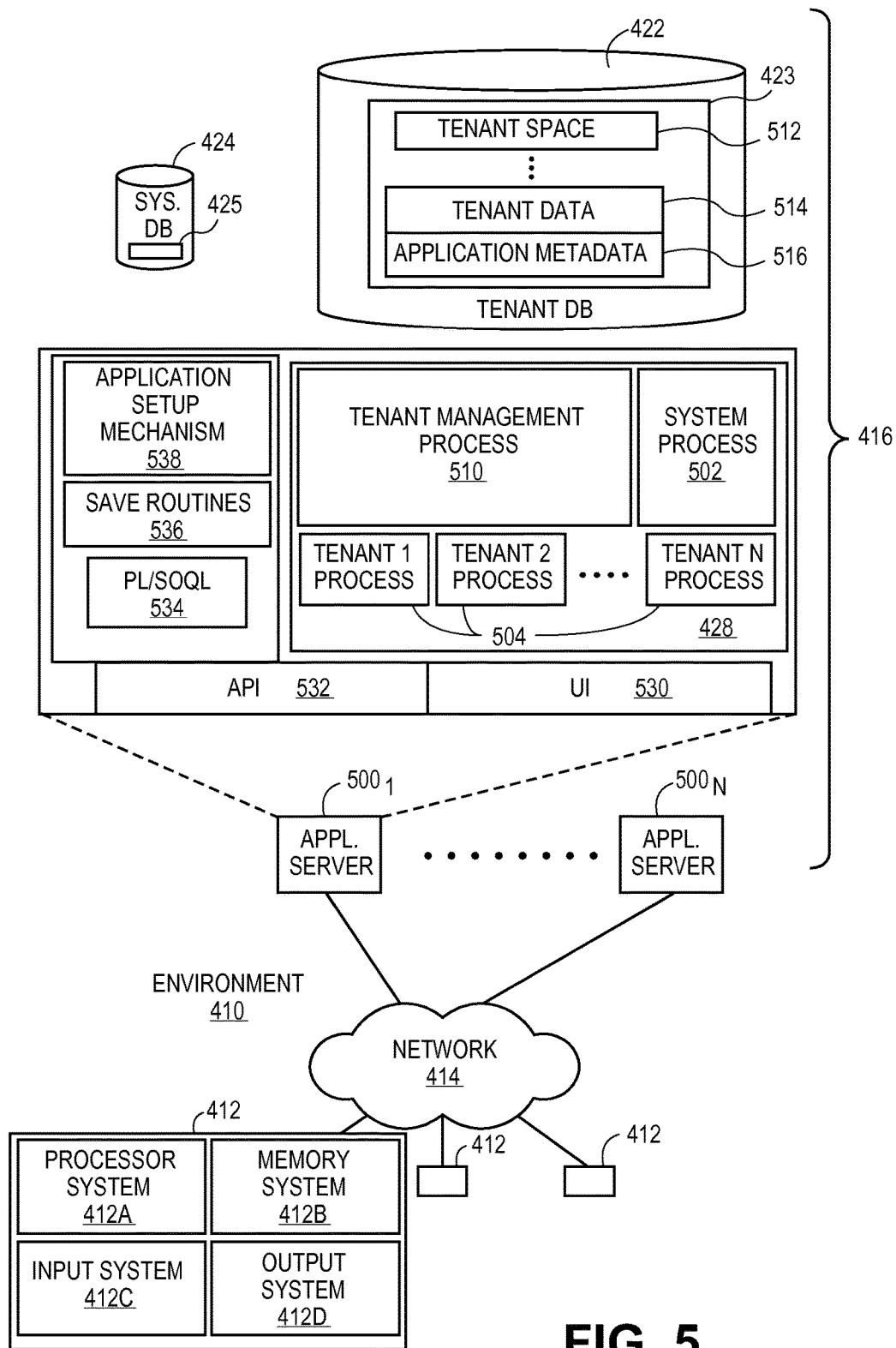
FIG. 5 is a block diagram of one embodiment of elements of environment of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage space 512, tenant data 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage spaces 512, which can be either a physical arrangement and/or a logical arrangement of data. Within each tenant storage space 512, tenant data 514 and application metadata 516 might be similarly allocated for each user. For example, a copy of a user's most recently used (MRU) items might be stored to tenant data 514. Similarly, a copy of MRU items for an entire organization that is a tenant might be stored to tenant storage space 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for providing asynchronous web service calls in an on-demand services environment, the method comprising:
accessing, in response to a request from a remote client computing device and with an application server, a page provided by one or more server computing devices of the on-demand services environment, the page having content including at least logic to retrieve information from a remote resource external to the on-demand services environment via at least one non-blocking, asynchronous web service call utilizing a thread pool;
loading a controller component of the page before rendering a response to the remote client computing device, wherein the controller component is executed by a first thread from the thread pool;
sending, with the first thread, at least one web service call to the remote resource with the controller component, wherein the at least one web service call comprises a computing device to computing device interaction over a network;
serializing, in parallel with the web service call, a state of the request;
storing the state of the request in a memory object outside of a virtual machine providing the controller component, wherein the state of the request is retrievable by using a continuation object;
returning the continuation object to the application server with the controller component to release the first thread from waiting for a response to the web service call to the remote resource, the continuation object providing at least a label to be used when handling the response when received from the remote resource;
receiving the response to the web service call from the remote resource;
resuming processing with the continuation object within the on-demand services environment in response to receiving the response utilizing a second thread from the thread pool; and
wherein within the on-demand services environment tenants have corresponding tenant identifiers (IDs) having one of one or more users associated with the respective tenant IDs, wherein users of each of multiple client entities can only access data identified by a tenant ID associated with the respective client entity, and wherein the on-demand services environment is provided by an entity separate from the client entities.

2. The method of claim 1 wherein multiple web service calls are processed in parallel with the controller component.

3. The method of claim 1 wherein multiple web service calls are processed sequentially with the controller component.

4. The method of claim 1 wherein the web service request processing is performed by a servlet.

5. A non-transitory computer-readable medium having stored thereon instruction that, when executed by one or more processors, provide non-blocking, asynchronous web service calls in an on-demand services environment, the instructions configurable to cause the one or more processors to:
access, in response to a request from a remote client computing device and with an application server, a page provided by one or more server computing devices of the on-demand services environment, the page having content including at least logic to retrieve information from a remote resource external to the on-demand services environment via at least one asynchronous web service call utilizing a thread pool;
load a controller component of the page before rendering a response to the remote client computing device, wherein the controller component is executed by a first thread from the thread pool;
send, with the first thread, at least one web service call to the remote resource with the controller component, wherein the at least one web service call comprises a computing device to computing device interaction over a network;
serialize, in parallel with the web service call, a state of the request;
store the state of the request in a memory object outside of a virtual machine providing the controller component, wherein the state of the request is retrievable by using a continuation object;
return the continuation object to the application server with the controller component to release the first thread from waiting for a response to the web service call to the remote resource, the continuation object providing at least a label to be used when handling the response when received from the remote resource;
receive the response to the web service call from the remote resource;
resume processing with the continuation object within the on-demand services environment in response to receiving the response utilizing a second thread from the thread pool; and
wherein within the on-demand services environment tenants have corresponding tenant identifiers (IDs) having one of one or more users associated with the respective tenant IDs, wherein users of each of multiple client entities can only access data identified by a tenant ID associated with the respective client entity, and wherein the on-demand services environment is provided by an entity separate from the client entities.

6. The non-transitory computer-readable medium of claim 5 wherein multiple web service calls are processed in parallel with the controller component.

7. The non-transitory computer-readable medium of claim 5 wherein multiple web service calls are processed sequentially with the controller component.

8. The non-transitory computer-readable medium of claim 5 wherein the web service request processing is performed by a servlet.

9. A system comprising:
a plurality of interconnected computing devices representing an on-demand services environment, including an application server, a user interface framework and an on-demand application platform, each including one or more processors and a memory having stored thereon instructions that, when executed by the one or more processors provide asynchronous web service calls in the on-demand services environment, including performing operations to:
access, in response to a request from a remote client computing device and with the application server, a page provided by one or more of the plurality of interconnected computing devices, the page having content including at least logic to retrieve information from a remote resource external to the on-demand services environment via at least one non-blocking, asynchronous web service call utilizing a thread pool;

load a controller component of the page before rendering a response to the remote client computing device, wherein the controller component is executed by a first thread from the thread pool;

send, with the first thread, at least one web service call to the remote resource with the controller component, wherein the at least one web service call comprises a computing device to computing device interaction over a network;

serialize, in parallel with the web service call, a state of the request;

store the state of the request in a memory object outside of a virtual machine providing the controller component, wherein the state of the request is retrievable by using a continuation object;

return the continuation object to the application server with the controller component to release the first thread from waiting for a response to the web service call to the remote resource, the continuation object providing at least a label to be used when handling the response when received from the remote resource;

receive the response to the web service call from the remote resource;

resume processing with the continuation object within the on-demand services environment in response to receiving the response utilizing a second thread from the thread pool; and wherein within the on-demand services environment tenants have corresponding tenant identifiers (IDs) having one of one or more users associated with the respective tenant IDs, wherein users of each of multiple client entities can only access data identified by a tenant ID associated with the respective client entity, and wherein the on-demand services environment is provided by an entity separate from the client entities.

10. The system of claim 9 wherein multiple web service calls are processed in parallel with the controller component.

11. The system of claim 9 wherein multiple web service calls are processed sequentially with the controller component.

12. The system of claim 9 wherein the web service request processing is performed by a servlet.

13. The method of claim 1 further comprising:
serializing one or more memory objects corresponding to the request; and
storing the one or more serialized memory objects outside of a memory allocated to a virtual machine providing the controller component.

14. The non-transitory computer-readable medium of claim 5 further comprising instructions that, when executed by the one or more processors, are configurable to cause the one or more processors to:
serialize one or more memory objects corresponding to the request; and
store the one or more serialized memory objects outside of a memory allocated to a virtual machine providing the controller component.

15. The system of claim 9 wherein the instructions when executed by the one or more processors further perform operations to:
serialize one or more memory objects corresponding to the request; and
store the one or more serialized memory objects outside of a memory allocated to a virtual machine providing the controller component.

* * * * *